United States Patent
Ogawa et al.

(10) Patent No.: US 8,200,418 B2
(45) Date of Patent: Jun. 12, 2012

(54) SCREEN FORMATION SYSTEM, SCREEN FORMATION METHOD, AND PROGRAM

(75) Inventors: Satoshi Ogawa, Okazaki (JP); Koichiro Hori, Okazaki (JP)

(73) Assignee: Aisin AW Co., Ltd., Anjo-Shi, Aichi (JP)

( * ) Notice: Subject to any disclaimer, the term of this patent is extended or adjusted under 35 U.S.C. 154(b) by 342 days.

(21) Appl. No.: 12/370,789

(22) Filed: Feb. 13, 2009

(65) Prior Publication Data

US 2009/0237413 A1    Sep. 24, 2009

(30) Foreign Application Priority Data

Mar. 19, 2008  (JP) .................................. 2008-072132

(51) Int. Cl.
*G09G 5/36* (2006.01)

(52) U.S. Cl. ......... 701/211; 701/200; 701/532; 345/548

(58) Field of Classification Search .......... 701/209–211, 701/1, 33
See application file for complete search history.

(56) References Cited

U.S. PATENT DOCUMENTS

| | | | | |
|---|---|---|---|---|
| 5,371,497 | A | | 12/1994 | Nimura et al. ................. 340/995 |
| 5,652,706 | A | * | 7/1997 | Morimoto et al. ............. 701/210 |
| 5,991,689 | A | * | 11/1999 | Aito et al. ....................... 701/209 |
| 6,067,502 | A | * | 5/2000 | Hayashida et al. ............ 701/211 |
| 7,149,530 | B1 | * | 12/2006 | Arakawa et al. .............. 455/456.1 |
| 7,272,497 | B2 | * | 9/2007 | Koshiji et al. ................. 701/211 |
| 7,636,632 | B2 | * | 12/2009 | Wolterman .................... 701/208 |
| 2006/0085123 | A1 | * | 4/2006 | Sugita ............................. 701/211 |
| 2007/0052546 | A1 | * | 3/2007 | Minagawa et al. ......... 340/815.4 |
| 2008/0300731 | A1 | * | 12/2008 | Nakajima et al. ................. 701/1 |
| 2009/0129739 | A1 | | 5/2009 | Kato et al. |
| 2011/0144857 | A1 | * | 6/2011 | Wingrove et al. ............... 701/33 |

FOREIGN PATENT DOCUMENTS

| | | |
|---|---|---|
| DE | 10-2006/024615 A1 | 11/2007 |
| JP | 2005-055239 | 3/2005 |
| JP | 2005-055239 A | 3/2005 |
| JP | 2007-062559 | 3/2007 |
| JP | 2007-072036 | 3/2007 |

OTHER PUBLICATIONS

European Search Report dated Dec. 2, 2011 in European Application No. 09002199.9.

* cited by examiner

*Primary Examiner* — Lena Najarian
*Assistant Examiner* — Teresa Woods
(74) *Attorney, Agent, or Firm* — Bacon & Thomas, PLLC

(57) ABSTRACT

A screen formation system includes: a vehicle condition determination processing unit that determines a vehicle condition; a storage device containing, recorded therein, a candidate screen map in which vehicle conditions and candidate screens are interrelated, each candidate screen representing a screen that is highly likely to be shown on a display unit next after a current screen on the basis of the determined vehicle condition; a candidate screen acquisition processing unit that acquires the candidate screen corresponding to the vehicle condition by referring to the candidate screen map; an off-screen drawing processing unit that draws the acquired candidate screen as an off-screen while the current screen is shown on the display unit; and a screen formation processing unit that shows the off-screen on the display unit responsive to an instruction for a screen change from the current screen made by an operator.

8 Claims, 8 Drawing Sheets

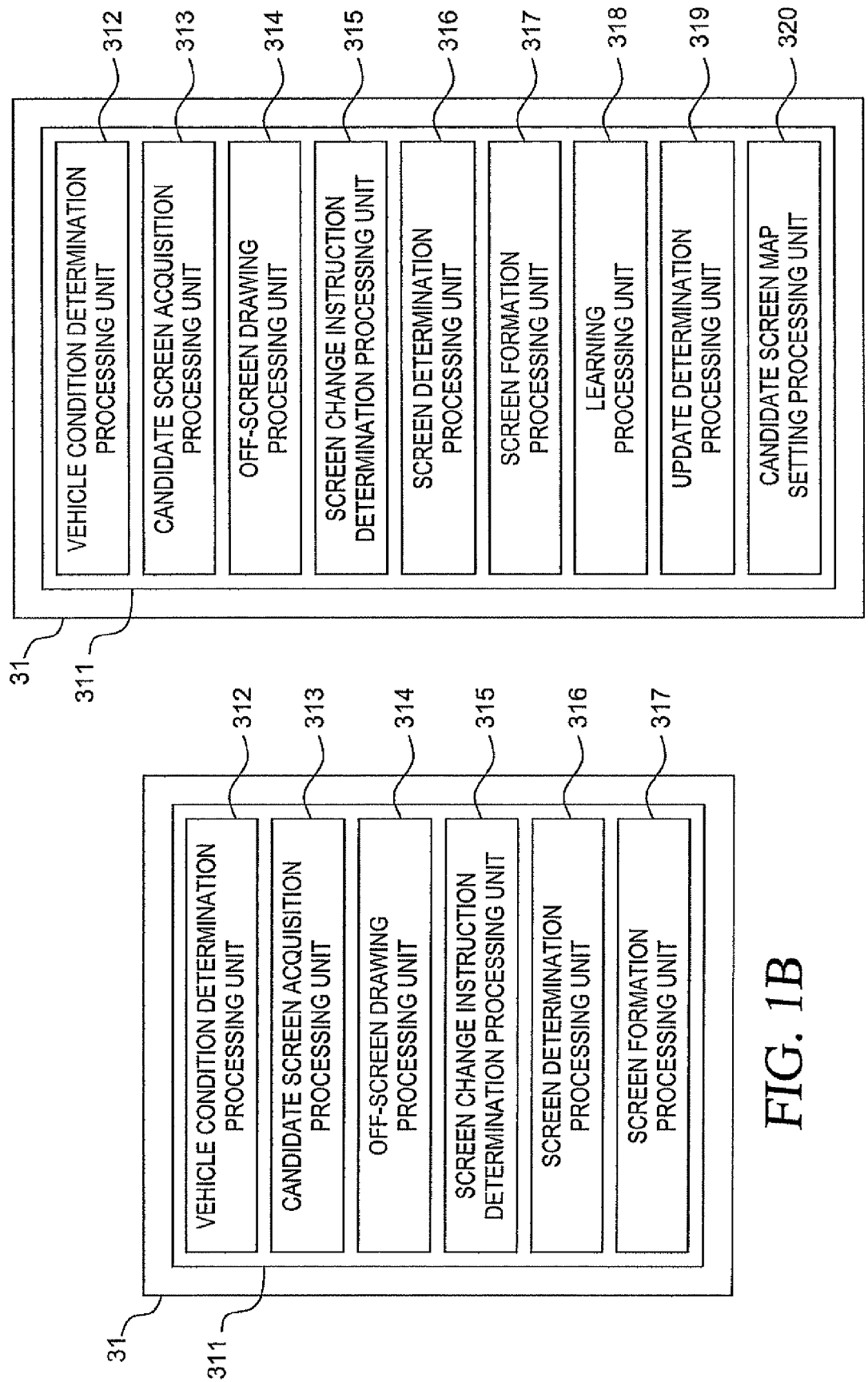

FIG. 4

| | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN | ◎ | | | | |
| DESTINATION SETTING SCREEN | | | | ◎ | |
| TRAFFIC INFORMATION SCREEN | | ◎ | | | ◎ |
| AUDIO OPERATION SCREEN | | | ◎ | | |
| AIR CONDITIONER OPERATING SCREEN | | | | | |

FIG. 5

| | VICINITY OF HOME | VICINITY OF HOME CONGESTED | SNOWING | UNDER HIGH TEMPERATURE/ UNDER LOW TEMPERATURE |
|---|---|---|---|---|
| NEXT GUIDANCE SCREEN | | | | |
| DESTINATION SETTING SCREEN | ◎ | | | |
| TRAFFIC INFORMATION SCREEN | | ◎ | | |
| AUDIO OPERATION SCREEN | | | ◎ | |
| AIR CONDITIONER OPERATING SCREEN | | | | ◎ |

FIG. 6

| | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN | 0 TIMES | 0 TIMES | 9 TIMES | 22 TIMES | 18 TIMES |
| DESTINATION SETTING SCREEN | 2 TIMES | 6 TIMES | 6 TIMES | 8 TIMES | 3 TIMES |
| TRAFFIC INFORMATION SCREEN | 1 TIMES | 10 TIMES | 12 TIMES | 10 TIMES | 14 TIMES |
| AUDIO OPERATION SCREEN | | | | | |
| AIR CONDITIONER OPERATING SCREEN | 1 TIMES | 2 TIMES | 3 TIMES | 4 TIMES | 22 TIMES |

FIG. 7

|  | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN | ◎ |  |  |  |  |
| DESTINATION SETTING SCREEN |  |  |  | ◎ |  |
| TRAFFIC INFORMATION SCREEN |  |  |  |  |  |
| AUDIO OPERATION SCREEN |  | ◎ | ◎ |  |  |
| AIR CONDITIONER OPERATING SCREEN |  |  |  |  | ◎ |

FIG. 8

ROUTE SEARCH NOT BEING PERFORMED

|  | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN |  |  |  |  | ◎ |
| DESTINATION SETTING SCREEN |  |  |  | ◎ |  |
| TRAFFIC INFORMATION SCREEN |  |  | ◎ |  |  |
| AUDIO OPERATION SCREEN | ◎ | ◎ |  |  |  |
| AIR CONDITIONER OPERATING SCREEN |  |  |  |  |  |

FIG. 9

ROUTE SEARCH BEING PERFORMED

|  | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN |  |  |  |  | ◎ |
| DESTINATION SETTING SCREEN | ◎ |  |  | ◎ |  |
| TRAFFIC INFORMATION SCREEN |  |  | ◎ |  |  |
| AUDIO OPERATION SCREEN |  | ◎ |  |  |  |
| AIR CONDITIONER OPERATING SCREEN |  |  |  |  |  |

FIG. 10

| | AIR CONDITIONER NOT BEING OPERATED | | | |
|---|---|---|---|---|
| | VICINITY OF HOME | VICINITY OF HOME CONGESTED | SNOWING | UNDER HIGH TEMPERATURE/ UNDER LOW TEMPERATURE |
| NEXT GUIDANCE SCREEN | | | | |
| DESTINATION SETTING SCREEN | ◎ | | | |
| TRAFFIC INFORMATION SCREEN | | ◎ | | |
| AUDIO OPERATION SCREEN | | | | |
| AIR CONDITIONER OPERATING SCREEN | | | | ◎ |

FIG. 11

| | DURING SPECIFIC PERIOD OF TIME AFTER AIR CONDITIONER HAS BEEN OPERATED | | | |
|---|---|---|---|---|
| | VICINITY OF HOME | VICINITY OF HOME CONGESTED | SNOWING | UNDER HIGH TEMPERATURE/ UNDER LOW TEMPERATURE |
| NEXT GUIDANCE SCREEN | | | | |
| DESTINATION SETTING SCREEN | ◎ | | | |
| TRAFFIC INFORMATION SCREEN | | ◎ | ◎ | |
| AUDIO OPERATION SCREEN | | | | |
| AIR CONDITIONER OPERATING SCREEN | | | | |

FIG. 12

| | VICINITY OF HOME | JUST AFTER ENGINE START | DURING LONG-TERM PARKING | DURING SHORT-TERM PARKING |
|---|---|---|---|---|
| NEXT GUIDANCE SCREEN | | | | |
| DESTINATION SETTING SCREEN | ◎ | | | |
| TRAFFIC INFORMATION SCREEN | | ◎ | | |
| AUDIO OPERATION SCREEN | | | ◎ | |
| AIR CONDITIONER OPERATING SCREEN | | | | ◎ |

FIG. 13

| | DURING NORMAL DRIVING | VICINITY OF HOME CONGESTED | DURING LOW-SPEED DRIVING | UNDER HIGH TEMPERATURE/ UNDER LOW TEMPERATURE | SNOWING |
|---|---|---|---|---|---|
| | ◎ | | | | |
| | | ◎ | ◎ | | ◎ |
| | | | | ◎ | |

FIG. 14

| | DURING NORMAL DRIVING | DURING LOW-SPEED DRIVING | DURING SHORT-TERM PARKING | DURING LONG-TERM PARKING | JUST AFTER ENGINE START |
|---|---|---|---|---|---|
| NEXT GUIDANCE SCREEN | ◎ | | | | |
| DESTINATION SETTING SCREEN | ○ | ◎ | ○ | ◎ | ○ |
| TRAFFIC INFORMATION SCREEN | | ○ | ◎ | ○ | |
| AUDIO OPERATION SCREEN | | | | | ◎ |
| AIR CONDITIONER OPERATING SCREEN | | | | | |

FIG. 15(a)

| | DESTINATION SETTING SCREEN |
|---|---|
| NAME INPUT SCREEN | 20 TIMES |
| TELEPHONE NUMBER INPUT SCREEN | 5 TIMES |
| ADDRESS INPUT SCREEN | 2 TIMES |
| MEMORY POINT DISPLAY SCREEN | 10 TIMES |

FIG. 15(b)

| | DESTINATION SETTING SCREEN |
|---|---|
| NAME INPUT SCREEN | ◎ |
| TELEPHONE NUMBER INPUT SCREEN | |
| ADDRESS INPUT SCREEN | |
| MEMORY POINT DISPLAY SCREEN | |

SCREEN FORMATION SYSTEM, SCREEN FORMATION METHOD, AND PROGRAM

INCORPORATION BY REFERENCE

The disclosure of Japanese Patent Application No. 2008-072132 filed on Mar. 19, 2008, including the specification, drawings and abstract thereof, is incorporated herein by reference in its entirety.

BACKGROUND OF THE INVENTION

1. Field of the Invention

The present invention relates to screen formation systems, screen formation methods, and programs.

2. Description of the Related Art

In conventional navigation devices, when a driver as an operator inputs a destination and sets search conditions, route search processing is performed based on the search conditions, and a route from a departure point represented by a current position to the destination is searched based on map data. Then, the searched route, i.e., a search route is displayed together with a vehicle position indicating the current position of a vehicle on a map screen formed in a display unit, and search route guidance, i.e., route guidance is performed. In addition to the display of the search route on the map screen, route guidance by voice is also performed.

Consequently, the driver can drive the vehicle along the displayed search route.

In the navigation devices, in order to improve the response of the display unit, an off-screen is drawn while a predetermined screen is formed as a current screen in the display unit so that the time of changing a screen can be reduced. When a vehicle approaches a first intersection, the screen formed in the display unit changes from a map screen to an enlarged view of the first intersection. If it is expected that the enlarged view of a second intersection will be formed, the enlarged view of the second intersection is drawn as an off-screen in advance. Then, after the vehicle passes the first intersection, the screen formed in the display unit changes from the enlarged view of the first intersection to the enlarged view of the second intersection (refer to Japanese Patent Application; Publication No. JP-A-6-66574, for example).

SUMMARY OF THE INVENTION

In the conventional navigation devices, a screen that is expected to be formed next can be drawn as an off-screen in advance. However, if a screen to be formed next is unknown, the screen cannot be drawn as an off-screen in advance.

Consequently, the response of the display unit cannot be improved.

The present invention has been devised in order to solve the above problems, and thus it is an object thereof is to provide a screen formation system, a screen formation method, and a program which enhance responsiveness of the display unit.

To achieve the aforementioned object, a screen formation system of the present invention includes: a vehicle condition determination processing unit that determines a vehicle condition; a storage device; a candidate screen map, recorded in the storage device, in which vehicle conditions and candidate screens are interrelated (associated or correlated), each candidate screen representing a screen that is highly likely to be shown on a display unit next after a current screen on the basis of the determined vehicle condition; a candidate screen acquisition processing unit that acquires, from the storage device, the candidate screen corresponding to the determined vehicle condition by referring to the candidate screen map; an off-screen drawing processing unit that draws the acquired candidate screen as an off-screen while the current screen is formed (displayed or shown) in the display unit; and a screen formation processing unit that shows the off-screen on the display unit responsive to an instruction for a screen change from the current screen made by an operator.

According to the present invention, the candidate screen corresponding to the determined vehicle condition is acquired by referring to the candidate screen map, and the acquired candidate screen is drawn as the off-screen while the current screen is formed in the display unit. Therefore, the responsiveness of the display unit is improved.

BRIEF DESCRIPTION OF THE DRAWINGS

FIG. 1B is a functional block diagram of one embodiment of the CPU of the navigation system shown in FIG. 1A; and FIG. 1C is a functional block diagram of another embodiment of the CPU of the navigation system shown in FIG. 1A.

FIG. 4 shows a candidate screen map in accordance with the first embodiment of the present invention.

FIG. 5 shows a candidate screen map in accordance with a second embodiment of the present invention.

FIG. 6 shows all example of recording contents of a screen change instruction table in accordance with a third embodiment of the present invention.

FIG. 7 shows an updated candidate screen map in accordance with the third embodiment of the present invention.

FIG. 8 shows a first candidate screen map in accordance with a fourth embodiment of the present invention.

FIG. 9 shows a second candidate screen map in accordance with the fourth embodiment of the present invention.

FIG. 10 shows a third candidate screen map in accordance with the fourth embodiment of the present invention.

FIG. 11 shows a fourth candidate screen map in accordance with the fourth embodiment of the present invention.

FIG. 12 shows a first part of a candidate screen map in accordance with a fifth embodiment of the present invention.

FIG. 13 shows a second part of the candidate screen map in accordance with the fifth embodiment of the present invention.

FIG. 14 shows a candidate screen map in accordance with a sixth embodiment of the present invention.

FIGS. 15A and 15B show a method for setting a candidate screen by learning in accordance with a seventh embodiment of the present invention.

DESCRIPTION OF THE PREFERRED EMBODIMENTS

Hereinafter, embodiments of the present invention will be described with reference to the drawings. In this case, a navigation system serving as a screen formation system is described.

Figure 1A:
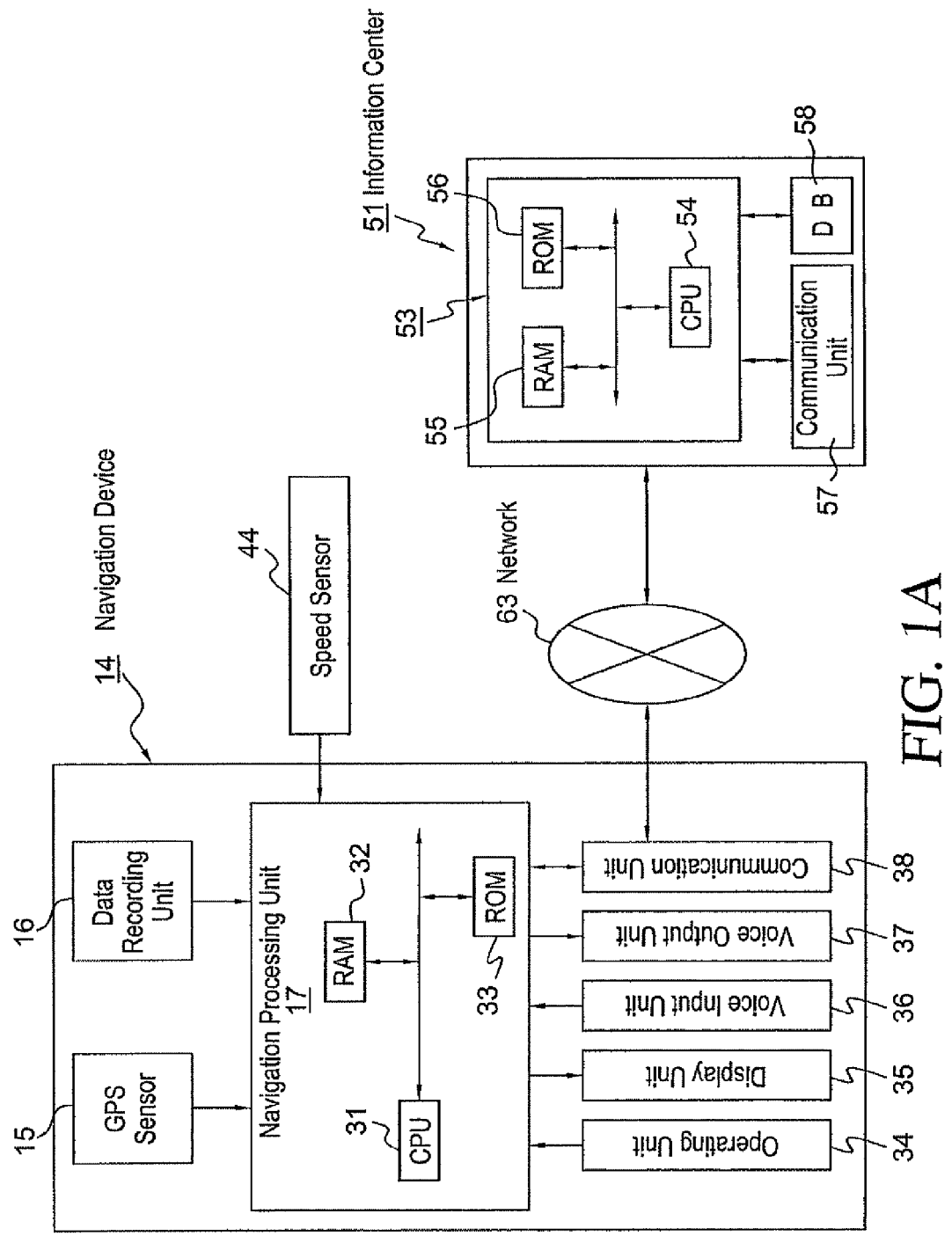
FIG. 1A is a block diagram showing a navigation system in accordance with a first embodiment of the present invention.

FIG. 1 is a block diagram showing a navigation system in accordance with a first embodiment of the present invention.

In FIG. 1, reference numeral 14 denotes an information terminal, for example, a navigation device serving as an in-vehicle device installed in a vehicle. Reference numeral 63 denotes a network. Reference numeral 51 denotes an information center serving as an information provider. The navigation system includes the navigation device 14, the network 63, the information center 51, and the like.

The navigation device 14 includes: a GPS sensor 15 serving as a current position detection unit that detects a vehicle position and a vehicle direction indicating the direction of the vehicle; a data recording unit 16 serving as an information recording unit in which map data and various other information are recorded; a navigation processing unit 17 that performs various kinds of arithmetic processing such as navigation processing and the like based on inputted information; an operating unit 34 serving as a first input unit for performing a predetermined input through an operation of a driver as an operator; a display unit 35 serving as a first output unit for performing various kinds of display using an image displayed on a screen (not shown) to perform a notification to the driver; a voice input unit 36 serving as a second input unit for performing a predetermined input by voice; a voice output unit 37 serving as a second output unit for performing various kinds of display by voice to perform a notification to the driver; and a communication unit 38 serving as a transmitting and receiving unit that functions as a communication terminal. The GPS sensor 15, the data recording unit 16, the operating unit 34, the display unit 35, the voice input unit 36, the voice output unit 37, and the communication unit 38 are connected to the navigation processing unit 17. Further, a speed sensor 44 serving as a speed detection unit that detects a vehicle speed is connected to the navigation processing unit 17. In the present embodiment, the vehicle direction is detected by the GPS sensor 15; however, a direction sensor serving as a direction detection unit for detecting the vehicle direction can be independently installed. In addition, the GPS sensor 15 detects a time in conjunction with the vehicle position and the vehicle direction.

Map data is recorded in the data recording unit 16. The map data includes intersection data regarding an intersection, node data regarding a node, road data regarding a road link, search data that has been processed for a search, facility data regarding a facility, and the like. In addition, data for outputting predetermined information by the voice output unit 37, statistical data, travel history data, and the like are recorded in the data recording unit 16.

In order to record the various kinds of data, the data recording unit 16 includes a disk (not shown) such as a hard disk, a CD, a DVD, an optical disk, and the like as well as a head (not shown) such as a reading/writing head for reading and writing the various kinds of data and the like. Further, a memory card or the like can be used for the data recording unit 16.

The navigation processing unit 17 includes: a CPU 31 serving both as a control device that performs an overall control of the navigation device 14 and as an arithmetic device; a RAM 32 that is used as a working memory when the CPU 31 performs various kinds of arithmetic processing; a ROM 33 in which a program for control and various other programs for performing a route search to a destination, search route guidance, i.e., route guidance, and the like are recorded; and a flash memory (not shown) that is used to record various kinds of data, programs, and the like.

The operating unit 34 is used for achieving various kinds of functions in the navigation device 14 through an operation of the operator. The operating unit 34 includes a remote control, a keyboard, a mouse, and the like that are installed independently of the navigation device 14, as well as a switch, a button, a key, a dial, and the like that are formed on a casing of the navigation device 14 or the like as operating elements (operating units). For the display unit 35, a display is used. In addition, for the display unit 35, a touch panel further having a function of the operating unit can be used. In the touch panel, a key, a switch, a button, and the like serving as operating elements represented as images are displayed on a screen, so that a predetermined input operation can be performed by touching the key, the switch, the button, and the like.

The voice input wait 36 includes a microphone (not shown) or the like, for input of necessary information by voice. The voice output unit 37 includes a voice synthesizer and a speaker (not shown), and various kinds of information are outputted by voice from the voice output unit 37.

The communication unit 38 includes a beacon receiver, a radio receiver, and the like. The beacon receiver receives various kinds of information such as traffic information, general information, and the like, which are transmitted from a road traffic information center or the like (not shown) as an information provider such as a VICS (a registered trademark) center, by a radio beacon, an optical beacon, or the like via a radio beacon device, an optical beacon device, or the like installed along a road. The radio receiver receives radio broadcasting such as FM multiple broadcasting from a radio station. The traffic information includes congestion information, regulatory information, parking information, traffic accident information, service area congestion state information, and the like, whereas the general information includes news, weather information (weather forecast), and the like. In addition, the communication unit 38 can receive various kinds of information such as traffic information, general information, and the like from the information center 51. To this end, the information center 51 includes a server 53, a communication unit 57 that is connected to the server 53, a data base (DB) 58 serving as an information recording unit, and the like. The server 53 includes a CPU 54 serving both as a control device and as an arithmetic device, a RAM 55, a ROM 56, and the like.

The navigation system, the navigation processing unit 17, the CPUs 31 and 54, the server 53, and the like function as a computer based on various programs, data, and the like. A recording medium includes the data recording unit 16, the RAMs 32 and 55, the ROMs 33 and 56, the data base 58, the flash memory, and the like. Further, an MPU or the like can be used as the arithmetic device in place of the CPUs 31 and 54.

Next, basic operations of the navigation system having the above structure are described.

At first, when the operating unit 34 is operated by the driver and the navigation device 14 is started, an initialization processing unit (not shown) of the CPU 31 performs initialization processing to read the vehicle position and the vehicle direction detected by the GPS sensor 15 and initialize various kinds of data. A matching processing unit (not shown) of the CPU 31 performs matching processing to locate the vehicle position by determining on which road link the vehicle position is positioned based on the track of the read vehicle position, the shape and the arrangement of each of the road links that form a road in the vicinity of the vehicle position, and the like.

Next, a basic information acquisition processing unit (not shown) of the CPU 31 performs basic information acquisition processing to acquire the map data by reading the data from the data recording unit 16 or by receiving the data from the information center 51 or the like via the communication unit 38.

A display processing unit 311 of the CPU 31 performs display processing to form a map screen in the display unit 35 and display the vehicle position, the map of the vicinity of the vehicle position, and the vehicle direction on the map screen.

Consequently, the driver can drive the vehicle following the vehicle position, the map of the vicinity of the vehicle position, and the vehicle direction.

When the driver inputs a destination through an operation of the operating unit 34, a destination setting processing unit (not shown) of the CPU 31 performs destination setting processing to set a destination. Also, it is possible to set a departure point through an input if necessary. Further, it is possible to register a specified point in advance and set the registered point as the destination. Subsequently, when the driver operates the operating unit 34 to input a search condition, a route search processing unit (not shown) of the CPU 31 performs route search processing to read the vehicle position, the destination, the search condition, and the like, to read the search data and the like from the data recording unit 16, to search for a route from the departure point represented by the vehicle position to the destination under the search condition on the basis of the vehicle position, the destination, the search data, and the like, and to output route data indicating the search route. In this case, a route for which a total of the link cost assigned to each road link is the smallest is set as the search route.

Route search processing can be performed in the information center 51. In this case, the CPU 31 transmits the vehicle position, the vehicle direction, the destination, the search condition, and the like to the information center 51 via the network 63. When the information center 51 receives the vehicle position, the vehicle direction, the destination, the search condition, and the like, a route search processing unit (not shown) of the CPU 54 performs the same route search processing as the CPU 31 to read the search data and the like from the database 58, to search for a route from the departure point to the destination on the basis of the vehicle position, the vehicle direction, the destination, the search condition, and the like, and to output the route data indicating the search route. Next, a transmitting processing unit (not shown) of the CPU 54 performs transmitting processing to transmit the route data to the navigation device 14 via the network 63.

Subsequently, a guidance processing unit (not shown) of the CPU 31 performs guidance processing to provide route guidance. To this end, a route display processing unit of the guidance processing unit performs route display processing to read the route data and to display the search route on the map screen according to the route data. In this case, a voice output processing unit of the guidance processing unit performs voice output processing to provide route guidance by outputting the search route by voice from the voice output unit 37, if necessary.

A guidance point enlarged view formation processing unit of the guidance processing unit performs guidance point enlarged view formation processing to form an enlarged view of a guidance intersection, i.e., an intersection enlarged view as a guidance point enlarged view, in a predetermined area of the map screen and provides route guidance using the intersection enlarged view, before the vehicle arrives at the guidance intersection. To this end, a guidance point enlarged view display point is set at a point that is before (on the vehicle position side of) the guidance intersection on the search route by a set distance. When the vehicle arrives at the guidance point enlarged view display point, the intersection enlarged view is formed in the display unit 35.

In this case, the map of the vicinity of the guidance intersection, the search route, and a landmark such as a facility or the like that can be a mark in the guidance intersection are displayed in the intersection enlarged view.

Upon receiving the traffic information via the communication unit 38, the display processing unit converts the traffic information into a congestion zone as a traffic condition indicator and displays the congestion zone along a road on the map screen. In this case, the congestion zone is displayed from the starting point to the ending point of the congestion in red, orange, green, or the like according to the level of the congestion. Thus, the driver can know congestion conditions of the roads in the route that is going to be traveled, the search route, or the like.

In the navigation device 14, in order to improve the response of the display unit 35, a screen that is highly likely to be formed next (a screen that is expected to be formed next) is drawn as an off-screen while a predetermined screen is formed as a current screen in the display unit 35, so that the time of changing a screen can be reduced.

Figure 2:
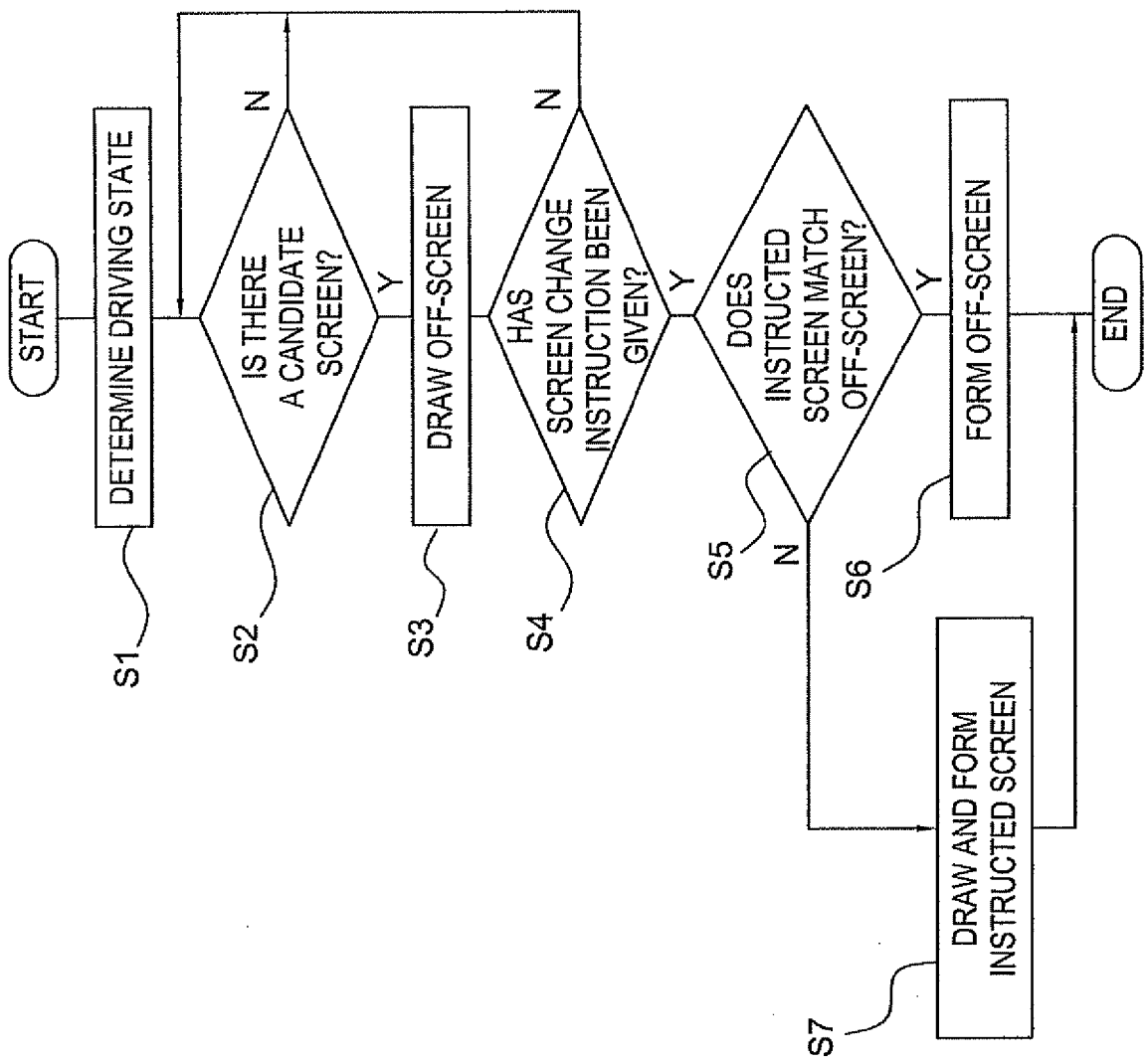
FIG. 2 is a flowchart showing an operation of a display processing unit in accordance with the first embodiment of the present invention.
Figure 3:
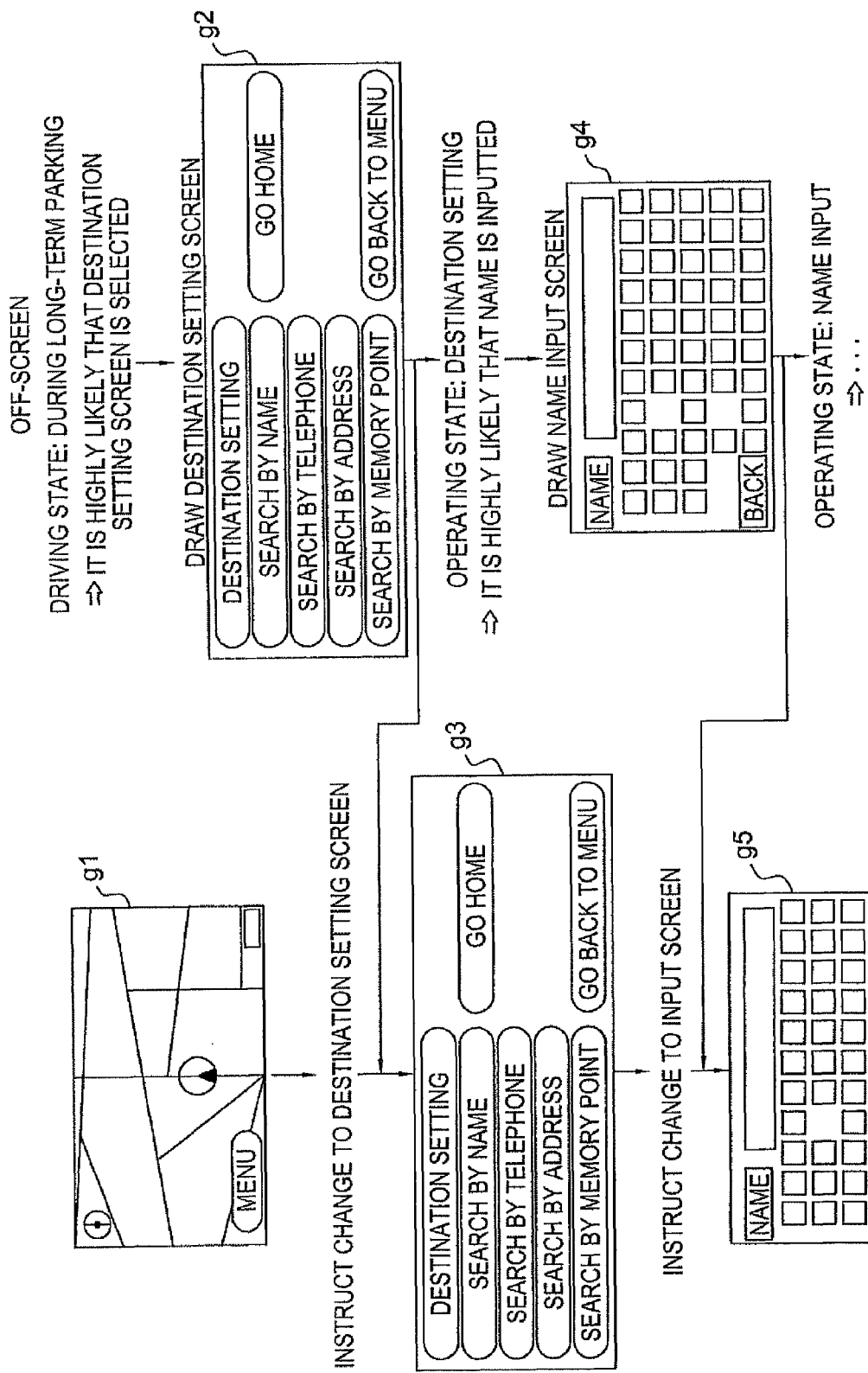
FIG. 3 shows an example of screen transitions in accordance with the first embodiment of the present invention.

FIG. 2 is a flowchart showing an operation of the display processing unit in accordance with the first embodiment of the present invention. FIG. 3 shows an example of screen transitions in accordance with the first embodiment of the present invention. FIG. 4 shows a candidate screen map in accordance with the first embodiment of the present invention.

In this case, it is necessary to select a screen that is highly likely to be formed next while the current screen is shown on the display unit 35. However, the screen that is highly likely to be formed next varies depending on the condition of the vehicle (including auxiliary devices such as the navigation device 14, an audio device, an air conditioner, and the like), i.e., a vehicle condition when the current screen is formed in the display unit 35.

In the present embodiment, the vehicle condition is categorized into a vehicle driving state that indicates a vehicle state during driving, a vehicle state that indicates a state of the vehicle itself, a vehicle environment state that indicates an environment surrounding the vehicle, an operating state of the auxiliary devices, and the like.

Here, a vehicle condition determination processing unit 312 of the display processing unit 311 performs vehicle condition determination processing to determine the vehicle condition, which is the vehicle driving state in the present embodiment, while the current screen is formed in the display unit 35.

To this end, the vehicle condition determination processing unit reads a vehicle speed detected by the speed sensor 44, a gearshift instruction signal given when a predetermined range has been selected by a shift lever serving as a gearshift instruction device (not shown), a brake signal given when a brake pedal (not shown) has been depressed, a start signal given when an engine (not shown) has been started, and the like, and determines the vehicle driving state based on the vehicle speed, the gearshift instruction signal, the brake signal, the start signal, and the like. A vehicle condition determination indicator generation unit includes the speed sensor 44, the shift lever, the brake pedal, the engine, and the like. A vehicle condition determination indicator includes the vehicle speed, the gearshift instruction signal, the brake signal, the start signal, and the like.

Note that ranges to be selected by the shift lever include a forward range, a reverse range, a neutral range, a parking range, and the like. A drive range includes the forward range, the reverse range, and the like, whereas a non-drive range includes the neutral range, the parking range and the like.

In the present embodiment, the driving state is categorized into "during normal driving" that indicates that the vehicle is traveling at an intermediate or a high speed, "during low-speed driving" that indicates that the vehicle is traveling at a low speed, "during short-time parking" that indicates that the vehicle is temporarily parked with the brake applied, "during long-time parking" that indicates that the vehicle is parked for a long-time with the parking range as a non-drive range selected, and "just after engine start" that indicates a state immediately after the engine has been started.

When the vehicle driving state is determined, a candidate screen acquisition processing unit 313 of the display processing unit 311 performs candidate screen acquisition processing to refer to the candidate screen map that is previously set in the RAM 32 ("storage device"), to determine whether or not there is a candidate screen corresponding to the vehicle driving state, and if there is a candidate screen corresponding to the vehicle driving state, to read and acquire the candidate screen.

To this end, while the current screen is displayed, a screen that is highly likely to be formed next in each of the expected driving states is selected as the candidate screen. The driving states and the candidate screens are associated with each other and recorded in a matrix structure in the candidate screen map.

According to the candidate screen map shown in FIG. 4, if the vehicle driving state is "during normal driving", a next guidance screen, for example, the enlarged view of the next intersection to be passed is recorded as the candidate screen. If the vehicle driving state is "during low-speed driving", a traffic information screen for displaying the traffic information is recorded as the candidate screen since the road is supposed to be currently congested. If the vehicle driving state is "during short-time parking", an audio operation screen for operating audio devices is recorded as the candidate screen. If the vehicle driving state is "during long-time parking" or "just after engine start", a destination setting screen is recorded as the candidate screen since a destination is highly likely to be set.

When the candidate screen corresponding to the vehicle driving state is acquired, an off-screen drawing processing unit 314 of the display processing unit 311 performs off-screen drawing processing to draw the acquired candidate screen as the off-screen (a secondary screen).

Subsequently, a screen change instruction determination processing unit 315 of the display processing unit 311 performs screen change instruction determination processing to determine whether or not an instruction for a screen change from the current screen, i.e., a screen change instruction has been made by the driver operating the operating unit 34.

When the screen change instruction has been made, a screen determination processing unit 316 of the display processing unit 311 performs screen determination processing to determine whether or not a screen that has been instructed, i.e., an instructed screen, matches the drawn off-screen. If the instructed screen matches the off-screen, a screen formation processing unit 317 of the display processing unit 311 performs screen formation processing to form (show or display) the off-screen in the display unit 35. If the instructed screen does not match the off-screen, the screen formation processing unit 317 draws the instructed screen and forms the screen in the display unit 35.

As shown in FIG. 3, for example, when a map screen g1 is formed as the current screen in the display unit 35, if the vehicle condition determination processing unit determines that the vehicle driving state is "during long-time parking", the candidate screen acquisition processing unit 313 refers to the candidate screen map and determines there is a candidate screen corresponding to the vehicle driving state, which is the destination setting screen in this case. That is, it is determined that the driver is highly likely to set a destination. Then, the off-screen drawing processing unit 314 reads the destination setting screen and draws the destination setting screen as the off-screen.

Subsequently, the screen change instruction determination processing unit 315 determines whether or not the screen change instruction has been made by the driver operating the operating unit 34.

When the screen change instruction has been made, the screen determination processing unit 316 determines whether or not the instructed screen matches the drawn off-screen g2. If the instructed screen is the destination setting screen, the destination setting screen matches the off-screen g2; therefore, the screen formation processing unit 317 forms the destination setting screen g3 that is the off-screen g2 in the display unit 35.

Note that the next guidance screen is not formed by the driver's operation. The off-screen drawing processing unit forms the intersection enlarged view as the off-screen before the guidance point enlarged view formation processing unit forms the intersection enlarged view when the vehicle arrives at the guidance point enlarged view display point.

Thus, when the destination setting screen g3 is formed, the destination setting screen g3 turns to the current screen. Subsequently, the vehicle condition determination processing unit determines the vehicle condition, which is the operating state of the navigation device 14 in this case, while the destination setting screen g3 is formed in the display unit 35. If it is determined that the operating state of the navigation device 14 is destination setting, the candidate screen acquisition processing unit 313 refers to a candidate screen map for operation of the navigation device 14 (not shown), i.e., a candidate screen map for screen transition, to determine whether or not there is a candidate screen corresponding to the operating state of the navigation device 14.

To this end, a screen that is highly likely to be formed next in each operating state of the navigation device 14 is set as the candidate screen in advance. Then, the candidate screens and the operating states are associated with each other and recorded in the candidate screen map for screen transition.

In setting a destination, it is possible to search the destination by a name, a telephone number, an address of the destination, or the like, or by a memory point that indicates a point registered in advance. It is also possible to designate home. Therefore, a name input screen for searching the destination by the name of the destination, a telephone number input screen for searching the destination by the telephone number of the destination, an address input screen for searching the destination by the address of the destination, and a memory point display screen for searching the destination by the memory point are formed in the display unit 35. In the present embodiment, the name input screen is recorded as the candidate screen corresponding to destination setting in the candidate screen map for screen transition.

Consequently, the candidate screen acquisition processing unit 313 selects the name input screen because it has been determined that the driver is highly likely to input the name of the destination.

Then, the off-screen drawing processing unit 314 reads the name input screen and draws the name input screen as the off-screen g4.

Subsequently, the screen change instruction determination processing unit 315 determines whether or not the screen change instruction has been made by the driver operating the operating unit 34.

When the screen change instruction has been made, the screen determination processing unit 316 determines whether or not the instructed screen matches the drawn off-screen g4.

If the instructed screen is the name input screen, the name input screen matches the off-screen g4. Therefore, the screen formation processing unit 317 forms the name input screen g5 that is the off-screen g4 in the display unit 35.

Thus, in the present embodiment the candidate screen that has been acquired according to the vehicle condition is drawn as the off-screen while a predetermined screen is formed in the display unit 35. Therefore, if the screen to be formed next is unknown, the off-screen can be drawn. Consequently, the response of the display unit 35 can be surely improved.

Next, the flowchart of FIG. 2 is explained.

Step S1: Determine a driving state.

Step S2: Determine whether or not there is a candidate screen correlated with the determined driving state. When there is a candidate screen, proceed to Step S3. When there is not a candidate screen, return to Step S1.

Step S3: Draw an off-screen.

Step S4: Determine whether or not a screen change instruction has been made. When a screen change instruction has been made, proceed to Step S5. When a screen change instruction has not been made, return to Step S1.

Step S5: Determine whether or not the instructed screen matches the off-screen. When the instructed screen matches the off-screen, proceed to Step S6. When the instructed screen does not match the off-screen, proceed to Step S7.

Step S6: Form the off-screen and terminate the process,

Step S7: Draw and form the instructed screen, and then terminate the process.

Next, a second embodiment of the present invention is described below. For the portions having the same structure as the first embodiment, the same reference numerals are assigned. The effects of the invention due to those portions having the same structure are the same as in the first embodiment.

FIG. 5 shows a candidate screen map in accordance with the second embodiment of the present invention.

In this second embodiment, the vehicle condition determination processing unit of the display processing unit determines the vehicle condition, which condition is the vehicle environment state in this second embodiment, while the current screen is formed in the display unit 35 serving as the first output unit.

To this end, the vehicle condition determination processing unit 312 reads the vehicle position detected by the GPS sensor 15 serving as the current position detection unit, the traffic information received via the communication unit 38, the weather information received via the communication unit 38, temperature in the vehicle detected by a temperature sensor (not shown) serving as a temperature detection unit that is installed in the vehicle, and the like, and determines the vehicle environment state based on the vehicle position, the traffic information, the weather information, the temperature in the vehicle, and the like. The vehicle condition determination indicator generation unit includes the GPS sensor 15, the communication unit 38, the temperature sensor, and the like. The vehicle condition determination indicator includes the vehicle position, the traffic information, the weather information, the temperature in the vehicle, and the like.

In the present embodiment, the vehicle environment state is categorized into "vicinity of home" indicating that the vehicle position is in the vicinity of home, "vicinity of home congested" indicating that the vehicle position is in the vicinity of home and congestion information of the traffic information has been received from the traffic information center, "snowing" indicating that it is snowing, "under high temperature/ under low temperature" indicating that the temperature is high or low.

When the vehicle environment state is determined, the candidate screen acquisition processing unit 313 refers to the candidate screen map that is previously set in the RAM 32, determines whether or not there is a candidate screen corresponding to (correlated with) the vehicle environment state, and reads and acquires the candidate screen if there is the candidate screen corresponding to the vehicle driving state.

To this end, while the current screen is displayed, a screen that is highly likely to be formed next in each of the expected vehicle environment states is selected as the candidate screen. The vehicle environment states and the candidate screens are associated with each other and recorded in a matrix structure in the candidate screen map.

According to the candidate screen map shown in FIG. 5, for example, if the vehicle environment state is "vicinity of home", the destination setting screen for setting a destination is recorded as the candidate screen. If the vehicle environment state is "vicinity of home congested", the traffic information screen for displaying the traffic information (a congestion condition) is recorded as the candidate screen. If the vehicle environment state is "snowing", the traffic information screen for displaying the traffic information (a road condition due to snow) is recorded as the candidate screen. If the vehicle environment state is "under high temperature/under low temperature", an air conditioner operation screen is recorded as the candidate screen since the air conditioner is highly likely to be used.

Next, a third embodiment of the present invention is described below. For the portions having the same structure as the first embodiment, the same reference numerals are assigned. The effects of the invention due to those portions having the same structure are the same as in the first embodiment.

FIG. 6 shows an example of recording contents of a screen change instruction table in accordance with the third embodiment of the present invention. FIG. 7 shows an updated candidate screen map in accordance with the third embodiment of the present invention.

In this third embodiment, as in the first embodiment, the screen change instruction determination processing unit determines whether or not the screen change instruction has been made by the driver operating the operating unit 34 serving as the first input unit. When the screen change instruction has been made, as described above, the screen determination processing unit 316 determines whether or not the instructed screen matches the off-screen. When the instructed screen matches the off-screen, the screen formation processing unit 317 forms the off-screen in the display unit 35 serving as the first output unit. When the instructed screen does not match the off-screen, the screen formation processing unit 317 draws the instructed screen and forms the screen in the display unit 35.

Here, a learning processing unit 318 of the display processing unit 311 performs learning processing to learn to which screen the driver instructed to change in which driving condition the vehicle was. To this end, the screen change instruction table serving as a learning recording unit shown in FIG. 6 is set in the RAM 32. In the screen change instruction table, the driving states and the candidate screens are associated with each other and the number of times changes have been instructed (hereinafter referred to as "instructed time") is recorded as a learning value indicating a learning result in a matrix structure. Consequently, the learning processing unit 318 increments the instructed time recorded in the screen change instruction table at every screen change instruction given when the current screen is formed.

In addition, an update determination processing unit 319 of the display processing unit 311 performs update determination processing to read each instructed time in the screen change instruction table and determine whether or not the instructed time equals or exceeds a threshold value. If the instructed time equals or exceeds the threshold value, the update determination processing unit 319 sets, as an update target combination, the combination of the vehicle driving state and the candidate screen of which the instructed time equals or exceeds the threshold value, and as a combination before update, the combination of the vehicle driving state and the candidate screen in the candidate screen map in an initial state such as the one shown in FIG. 4 or a current candidate screen map, and determines whether or not the update target combination differs from the combination before update. If the update target combination differs from the combination before update, the update determination processing unit determines that updating of the candidate screen map is necessary.

Subsequently, an update processing unit as a candidate screen map setting processing unit 320 of the display processing unit 311 performs update processing as candidate screen map setting processing to set the candidate screen map by recording the update target combination in the candidate screen map. Thus, the candidate screen map is updated; accordingly the candidate screen map such as the one shown in FIG. 7 can be set.

In the present embodiment, the candidate screen map such as the one shown in FIG. 7 is set if an audio device is frequently operated while the vehicle is traveling at a low speed, and an air conditioner is frequently operated just after the engine has been started.

That is, according to the candidate screen map, if the vehicle driving state is "during normal driving", the next guidance screen is recorded as the candidate screen. If the vehicle driving state is "during low-speed driving" or "during short-time parking", the audio operation screen is recorded as the candidate screen. If the vehicle driving state is "during long-time parking", the destination setting screen for setting a destination is recorded as the candidate screen. If the vehicle driving state is "just after engine start", the air conditioner operation screen is recorded as the candidate screen.

In addition, the learning processing unit can learn to which screen the driver instructed to change also for vehicle conditions other than the vehicle driving states. In this case, the instructed time is recorded in the screen change instruction table such that the vehicle conditions other than the vehicle driving states and the candidate screens are associated with each other. Then, the update processing unit updates the candidate screen map based on the instructed time.

Thus, in the present embodiment, the candidate screen map is updated on the basis of a record of when the driver has changed a screen. Therefore, the screen that is highly required to be formed can be surely formed.

In addition, it is possible, without using the candidate screen map in the initial state set in advance, to set and update the candidate screen map by the update processing unit. In this case, the update processing unit reads the instructed time of each candidate screen that is recorded in the screen change instruction table for each vehicle driving state, selects the candidate screen of which the instructed time is the largest, determines the combination of the vehicle driving state and the selected candidate screen as the update target combination, records the combination in the candidate screen map, and sets the candidate screen map in the initial state. After that, the update processing unit updates the candidate screen map on the basis of learning results.

Meanwhile, with a change of an operation state of the auxiliary devices, the screen that is highly likely to be formed next may change. In this case, if the candidate screen is read by referring to the same candidate screen map, an appropriate off-screen according to the operation state of the auxiliary devices cannot be drawn.

Here, a fourth embodiment of the present invention is described below, in which the candidate screen map to be referenced is changed according to the operation state of the auxiliary devices.

FIG. 8 shows a first candidate screen map in accordance with the fourth embodiment of the present invention. FIG. 9 shows a second candidate screen map in accordance with the fourth embodiment of the present invention. FIG. 10 shows a third candidate screen map in accordance with the fourth embodiment of the present invention. FIG. 11 shows a fourth candidate screen map in accordance with the fourth embodiment of the present invention.

In this case, in the navigation device 14 serving as the in-vehicle device that is an auxiliary device, if the route search by the route search processing unit is not being performed, the possibility that a destination is set is high, whereas the possibility that the audio device is operated is low. Then, according to the first candidate screen map shown in FIG. 8, if the vehicle driving state is "during normal driving", the audio operation screen is recorded as the candidate screen. If the vehicle driving state is "during low-speed driving", the traffic information screen is recorded as the candidate screen. If the vehicle driving state is "during short-time parking", the audio operation screen is recorded as the candidate screen. If the vehicle driving state is "during long-time parking" or "just after engine start", the destination setting screen is recorded as the candidate screen.

On the other hand, in the navigation device 14, if the route search by the route search processing unit is being performed, the possibility that a destination is set is low, whereas the possibility that the audio device is operated is high. Then, according to the second candidate screen map shown in FIG. 9, if the vehicle driving state is "during normal driving", the next guidance screen is recorded as the candidate screen. If the vehicle driving state is "during low-speed driving", the traffic information screen is recorded as the candidate screen. If the vehicle driving state is "during short-time parking", "during long-time parking", or "just after engine start", the audio operation screen is recorded as the candidate screen.

In addition, if the air conditioner as the auxiliary device is not being operated under low or high temperature, the air conditioner is highly likely to be operated. Then, according to the third candidate screen map shown in FIG. 10, if the vehicle environment state is "vicinity of home", the destination setting screen is recorded as the candidate screen. If the vehicle environment state is "vicinity of home congested" or "snowing", the traffic information screen is recorded as the candidate screen. If the vehicle environment state is "under high temperature/under low temperature", the air conditioner operation screen is recorded as the candidate screen.

During a specific period of time after the air conditioner has been operated, even if the temperature is high or low, the possibility that the air conditioner is operated again is low. Then, according to the fourth candidate screen shown in FIG. 11, if the vehicle environment state is "vicinity of home", the destination setting screen is recorded as the candidate screen. If the vehicle environment state is "vicinity of home congested" or "snowing", the traffic information screen is recorded as the candidate screen.

Thus, with a change of the operation state of the auxiliary devices, the candidate screen map to be referenced is changed. Therefore, an appropriate off-screen according to the operation state of the auxiliary devices can be drawn.

In the first embodiment of the present invention, the vehicle condition while the current screen is formed in the display unit 35 is defined with the vehicle driving state, and the candidate screen map shown in FIG. 4 is referenced to draw the next screen. In the second embodiment of the present invention, the vehicle condition while the current screen is formed in the display unit 35 is defined with the vehicle environment state, and the candidate screen map shown in FIG. 5 is referenced to draw the next screen.

That is, in the first embodiment of the present invention, the off-screen cannot be drawn on the basis of the candidate screen corresponding to the vehicle environment state. And, in the second embodiment of the present invention, the off-screen cannot be drawn on the basis of the candidate screen corresponding to the vehicle driving state. As the result, the off-screen cannot be drawn according to various vehicle conditions. Hence, the response of the display unit 35 cannot be improved sufficiently.

Here, a fifth embodiment of the present invention is described below, in which the off-screen can be drawn according to various vehicle conditions.

FIG. 12 shows a first part of a candidate screen map in accordance with the fifth embodiment of the present invention. FIG. 13 shows a second part of the candidate screen map in accordance with the fifth embodiment of the present invention.

In this case, the vehicle condition is defined with the vehicle driving state and the vehicle environment state. The vehicle driving state is categorized into "during normal driving", "during low-speed driving", "during short-time parking", "during long-time parking", and "just after engine start". The vehicle environment state is categorized into "vicinity of home", "vicinity of home congested", "snowing", and "under high temperature/under low temperature".

If the vehicle condition is the vehicle driving state, the candidate screen map shown in FIG. 4 is referred, and if the vehicle condition is the vehicle environment state, the candidate screen map shown in FIG. 5 is referenced. And, if the vehicle condition corresponds to a predetermined vehicle driving state and a predetermined vehicle environment state, two different candidate screens may be selected.

For example, if the vehicle condition is "during low-speed drive" in the vehicle driving state and "vicinity of home" in the driving environment state, and then the candidate screen maps shown in FIGS. 4 and 5 are referred, the traffic information screen and the destination setting screen may be selected as the candidate screen.

Here, in the present embodiment, by comparing the candidate screens corresponding to the vehicle conditions of the vehicle driving state and the vehicle environment state, and determining the candidate screen that is highly likely to be formed and the candidate screen that is less likely to be formed, priorities are assigned to the respective vehicle conditions.

In the present embodiment, the most prioritized case is when the vehicle environment state is "vicinity of home", followed by when the vehicle driving state is "just after engine start", when the vehicle driving state is "during long-time parking", when the vehicle driving state is "during short-time parking", when the vehicle driving state is "during normal driving", when the vehicle environment state is "vicinity of home congested", when the vehicle driving state is "during low-speed driving", and when the vehicle environment state is "under high temperature/under low temperature", which is the least prioritized case. In the candidate screen map shown in FIGS. 12 and 13, the priority of the vehicle condition is higher on the left side, lower on the right side.

Consequently, the vehicle condition determination processing unit determines the vehicle condition. If the vehicle condition is "during low-speed driving" in the vehicle driving state and "vicinity of home" in the vehicle environment state, the candidate screen acquisition processing unit reads, as the candidate screen, the destination setting screen that corresponds to "vicinity of home" that has a higher priority than "during low-speed driving".

Thus, in the present embodiment, a priority is assigned to each vehicle condition. Therefore, a predetermined candidate screen can be easily read based on a plurality of the vehicle conditions.

In the present embodiment, a case in which the vehicle condition corresponds to a predetermined vehicle driving state and a predetermined vehicle environment state is described. However, the present invention can be also applied to a case in which the vehicle condition corresponds to two or more vehicle driving states.

For example, if the vehicle is parked with the brake applied and the parking range selected, the vehicle condition corresponds to "during short-time parking" and "during long-time parking" in the vehicle driving state. Then, if the candidate screen map shown in FIG. 4 is referenced, the audio operation screen and the destination setting screen may be selected as the candidate screen.

However, in the present embodiment, a priority is assigned to each vehicle condition in the candidate screen map shown in FIGS. 12 and 13. Therefore, the destination setting screen that corresponds to "during long-time parking" that has a higher priority than "during short-time parking" is read as the candidate screen.

In the present embodiment, as shown in FIGS. 12 and 13, a priority is assigned to each vehicle condition in one candidate screen map. However, it is possible that the candidate screen maps shown in FIGS. 4 and 5 are directly stored in the RAM 32 and priorities are assigned in the respective candidate screen maps.

In this case, the amount of memory to be used by the respective candidate screen maps in the RAM 32 increases, and if the RAM 32 is used for other processing than the display processing, referring to the respective candidate screen maps will be difficult.

Hence, a sixth embodiment of the present invention is described below. In the embodiment, one candidate screen map in which a plurality of candidate screens are set to each vehicle condition with priorities is recorded, and the respective candidate screens are drawn as the off-screen in the order of the highest priority first. For the portions having the same structure as the first embodiment, the same reference numerals are assigned. The effects of the invention due to those portions having the same structure are the same as in the first embodiment.

FIG. 14 shows a candidate screen map in accordance with the sixth embodiment of the present invention.

In this case, in the candidate screen map, if the vehicle driving condition is "during normal driving", (starting with the higher priority) the next guidance screen and the traffic information screen are recorded as the candidate screen. If the vehicle driving condition is "during low-speed driving", (starting with the higher priority) the audio operation screen and the traffic information screen are recorded as the candidate screen. If the vehicle driving condition is "during short-time parking", (starting with the higher priority) the audio operation screen and the destination setting screen are recorded as the candidate screen. If the vehicle driving condition is "during long-time parking", (starting with the higher priority) the destination setting screen and the audio operation screen are recorded as the candidate screen. If the vehicle driving condition is "just after engine start", (starting with the higher priority) the air conditioner operation screen and destination setting screen are recorded as the candidate screen.

When the vehicle driving state is determined, the candidate screen acquisition processing unit reads and acquires a plurality of candidate screens.

Subsequently, the off-screen drawing processing unit draws the acquired plurality of candidate screens as the off-screen. Then, if the driver performs the screen change instruction, the screen determination processing unit determines whether or not the instructed screen matches any of the drawn off-screens in the order of the highest priority first. If the instructed screen matches one of the drawn off-screens, the screen formation processing unit forms the matched off-screen.

In the first embodiment of the present invention, when the destination setting screen has been formed in the display 35, the name input screen is recorded as the candidate screen according to the candidate screen map for screen transition. However, the candidate screens in the candidate screen map for screen transition can be set by learning.

Here, a seventh embodiment of the present invention is described below, in which the candidate screens in the candidate screen map for screen transition are set by learning. For the portions having the same structure as the first embodiment, the same reference numerals are assigned. The effects of the invention due to those portions having the same structure are the same as in the first embodiment.

FIGS. 15A and 15B show a method for setting a candidate screen by learning in accordance with the seventh embodiment of the present invention.

In this case, the learning processing unit performs learning processing to learn to which screen in which screen formed in the display unit 35 as the first output unit the driver instructed to change. To this end, the screen change instruction table serving as the learning recording unit shown in FIG. 15A is set in RAM 32. In the screen change instruction table, associating with a screen before a transition, which is the destination setting screen in the present embodiment, every time a change is instructed and the screen transition is performed to a predetermined screen, the instructed time is recorded as the learning value. Consequently, the learning processing unit increments the instructed time recorded in the screen change instruction table for each screen change instruction given when a predetermined screen is formed.

Then, the candidate screen map setting processing unit of the display processing unit performs candidate screen map setting processing to set as the candidate screen the screen with the largest instructed time registered in the screen change instruction table. For example, the name input screen is set as the candidate screen in the candidate screen map shown in FIG. 15B.

Thus, it is possible to learn to which screen the driver instructed to change and set the candidate screen in performing the screen transition. Therefore, the response of the display unit 35 is further improved.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A screen formation system for formation of screens for display on a display unit comprising:
    a vehicle condition determination processing unit that determines a vehicle condition;
    a storage device;
    a candidate screen map, recorded in the storage device, in which vehicle conditions and candidate screens are interrelated, each candidate screen representing a screen that is highly likely to be shown on a display unit next after a current screen on the basis of the determined vehicle conditions, wherein said candidate screen map is set by:
        a learning processing unit that learns, in association with the vehicle condition, to which screen a screen change has been instructed by an operator; and
        a candidate screen map setting processing unit that sets the candidate screen map based on said learning by the learning processing unit;
    a candidate screen acquisition processing unit that acquires, from the storage device, the candidate screen corresponding to the determined vehicle condition by referring to the candidate screen map set by the candidate screen map setting processing unit;
    an off-screen drawing processing unit that draws the acquired candidate screen as an off-screen while the current screen is shown on the display unit; and
    a screen formation processing unit that shows the off-screen on the display unit responsive to an instruction for a screen change from the current screen made by the operator.

2. The screen formation system according to claim 1, wherein
    the vehicle condition is a vehicle driving state that indicates a vehicle state associated with driving, and the vehicle driving state and a corresponding candidate screen are correlated in the candidate screen map stored in the storage device.

3. The screen formation system according to claim 1, wherein
    the vehicle condition is a driving environment, and a vehicle environment state that indicates an environment surrounding a vehicle and a corresponding candidate screen are correlated in the candidate screen map stored int eh storage device.

4. The screen formation system according to claim 1, wherein
    the candidate screen map is set according to an operating state of an auxiliary device.

5. The screen formation system according to claim 1, wherein
    priorities are assigned to the vehicle conditions in the candidate screen map, and the candidate screen acquisition processing unit acquires the candidate screen based on the priorities.

6. The screen formation system according to claim 1, wherein
    ap plurality of candidate screens are set corresponding to the vehicle condition and priorities are assigned to the respective candidate screens in the candidate screen map, and the candidate screen acquisition processing unit acquires a candida screen based on the priorities.

7. A screen formation method comprising:
    determining a vehicle condition;
    recording, in a storage device, a candidate screen map in which vehicle conditions and candidate screens are interrelated, each candidate screen representing a screen that is highly likely to be shown on a display unit next after a current screen on the basis of the determined vehicle conditions, said candidate screen map being set by the steps of:

a learning processing unit learning, in association with the vehicle condition, to which screen a screen change has been instructed by an operator; and setting the candidate screen map based on said learning by the learning processing unit;

acquiring the candidate screen corresponding to the determined vehicle condition by referring to the candidate screen map;

drawing the acquired candidate screen as an off-screen while the current screen is shown on the display unit; and showing the off-screen on the display unit responsive to an instruction for a screen change from the current screen made by the operator.

8. A non-transitory computer-readable medium having encoded thereon, a program causing a computer to function as:

a vehicle condition determination processing unit that determines a vehicle condition;

a storage device containing, recorded therein, a candidate screen map in which vehicle conditions and candidate screens are interrelated, each candidate screen representing a screen that is highly likely to be shown on a display unit next after a current screen on the basis of the determined vehicle conditions, wherein said candidate screen map is set by:

a learning processing unit that learns, in association with the vehicle condition, to which screen a screen change has been instructed by an operator; and a candidate screen map setting processing unit that sets the candidate screen map based on said learning by the learning processing unit;

a candidate screen acquisition processing unit that acquires, from the storage device, the candidate screen corresponding to the determined vehicle condition by referring to the candidate screen map set by the candidate screen map setting processing unit;

an off-screen drawing processing unit that draws the acquired candidate screen as an off-screen while the current screen is shown on the display unit;

a screen formation processing unit that shows the off-screen on the display unit responsive to an instruction for a screen change from the current screen made by the operator.

\* \* \* \* \*